No. 629,182. Patented July 18, 1899.
L. WISE.
BEAN SHOOTER.
(Application filed Mar. 22, 1899.)
(No Model.)
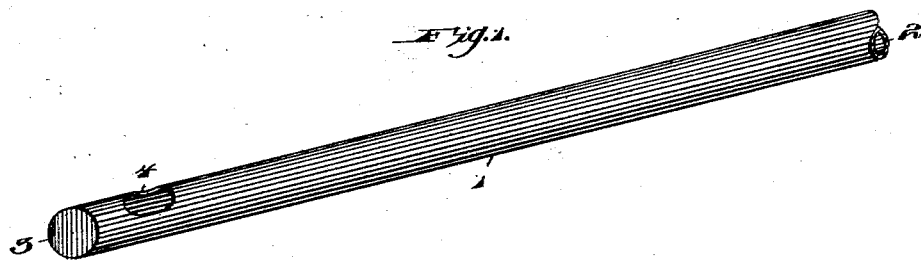
WITNESSES: 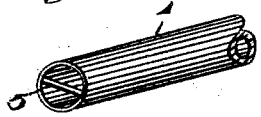 INVENTOR
Leslie Wise.
BY
ATTORNEYS

UNITED STATES PATENT OFFICE.

LESLIE WISE, OF McKEESPORT, PENNSYLVANIA.

BEAN-SHOOTER.

SPECIFICATION forming part of Letters Patent No. 629,182, dated July 18, 1899.

Application filed March 22, 1899. Serial No. 710,023. (No model.)

*To all whom it may concern:*

Be it known that I, LESLIE WISE, a citizen of the United States of America, residing at McKeesport, in the county of Allegheny and State of Pennsylvania, have invented certain new and useful Improvements in Bean-Shooters, of which the following is a specification, reference being had therein to the accompanying drawings.

My invention relates to certain new and useful improvements in bean blowers or shooters.

The object of my invention is to construct a bean blower or shooter with means to prevent a pellet or bean from passing into the mouth when the shooter or blower is elevated in the act of discharging the pellet or bean.

My invention finally consists in the novel combination and arrangement of parts hereinafter more fully described, and particularly pointed out in the claim.

In describing the invention in detail reference is had to the accompanying drawings, forming a part of this specification, wherein like numerals of reference indicate corresponding parts throughout the several views thereof, and in which—

Figure 1 is a perspective view of my improved blower or shooter partly broken away at one end. Fig. 2 is a side view thereof, partly in section. Fig. 3 is a cross-sectional view taken on the line $x\,x$, Fig. 2. Fig. 4 is a modified form of my improved stop to prevent the pellet or bean from entering the mouth.

Referring to the drawings by reference-numerals, 1 indicates the blower or shooter, which is formed of an elongated hollow cylindrical tube of any desired length and of any desired material. These blowers or shooters are usually made of tin, but of course, as heretofore stated, any desired material may be used. This blower or shooter 1 is open at one end, as at 2, and at its opposite end sealed by means of a concentric disk 3, which is either formed integral with the tube or suitably secured thereto. This disk prevents the pellet or bean from entering the mouth in the act of blowing.

The blower or shooter 1 is provided with an opening 4, which opening allows for the discharge of the pellet or bean from the shooter or blower by blowing therein.

It will be observed that my improved blower possesses a great advantage—that is, by the use of the concentric disk sealing the one end thereof the pellet or bean never enters the mouth, as is often the case. The beans or pellets have been known to lodge in the throat or to be swallowed by the operator using the blower or shooter.

In Fig. 4 I have shown a modified form of stop, which consists of a bar 5, formed integral with one end of the blower or secured thereto in any desirable manner. In this modified form the opening used for blowing the bean from the blower or shooter is dispensed with.

It will be noted that various changes may be made in the details of construction without departing from the general spirit of my invention.

Having thus fully described my invention, what I claim as new, and desire to secure by Letters Patent, is—.

In a bean blower or shooter a hollow cylindrical tube having an opening formed in the side near one end thereof and a concentric disk formed integral with the end that the opening is arranged in, substantially as set forth.

In testimony whereof I affix my signature in the presence of two witnesses.

LESLIE WISE.

Witnesses:
  JOHN NOLAND,
  E. W. ARTHUR.